United States Patent [19]
Ofstead

[11] Patent Number: 4,618,649
[45] Date of Patent: * Oct. 21, 1986

[54] COPOLYMERS OF POLY(VINYL TRIFLUOROACETATE) OR POLY(VINYL ALCOHOL)

[75] Inventor: Ronald F. Ofstead, Maplewood, Minn.

[73] Assignee: Minnesota Mining and Manufacturing Company, St. Paul, Minn.

[*] Notice: The portion of the term of this patent subsequent to Jul. 9, 2002 has been disclaimed.

[21] Appl. No.: 731,915

[22] Filed: May 8, 1985

Related U.S. Application Data

[63] Continuation-in-part of Ser. No. 500,785, Jun. 3, 1983, Pat. No. 4,528,325.

[51] Int. Cl.$^4$ ............................................. C08F 16/06
[52] U.S. Cl. .................................. 525/60; 525/326.2; 525/378; 525/379; 526/245
[58] Field of Search ............... 526/245; 525/60, 326.2, 525/378, 379

[56] References Cited

U.S. PATENT DOCUMENTS

| | | | |
|---|---|---|---|
| 2,436,144 | 2/1948 | Howk et al. | 260/37 |
| 3,220,960 | 11/1965 | Wichterle | 260/2.5 |
| 3,361,858 | 1/1968 | Wichterle | 264/1 |
| 3,388,199 | 6/1968 | Chaney et al. | 264/182 |
| 3,427,298 | 2/1969 | Tsuboi et al. | 260/91.3 |
| 3,882,005 | 5/1975 | Hoyt et al. | 526/245 |
| 4,528,325 | 7/1985 | Ofstead | 525/60 |

FOREIGN PATENT DOCUMENTS

| | | | |
|---|---|---|---|
| 53-91995 | 8/1978 | Japan . | |
| 53-103092 | 9/1978 | Japan . | |
| 0034867 | 3/1983 | Japan | 526/245 |

OTHER PUBLICATIONS

Harris, et al., *J. Polymer Sci.*, A-1, 4, 665–677 (1966).
Haas, et al., *J. Polymer Sci.*, 22, 291 (1956).
L. A. Vol'f, et al., *Khim. Volokna*, 2, 14 (1979).
J. Chernikov, et al. *Nauchn Tr.*, Kuban Gos. Univ., 243, 141 (1977).

Primary Examiner—Joseph L. Schofer
Assistant Examiner—J. M. Reddick
Attorney, Agent, or Firm—Donald M. Sell; James A. Smith; Lorraine R. Sherman

[57] ABSTRACT

Novel, non-crosslinked copolymers of vinyl trifluoroacetate (VTA) and up to 5 weight percent of the VTA of certain comonomers, such as vinyl esters, vinyl ethers, or disubstituted ethylene monomers, are disclosed. Solvolysis of these copolymers provides novel water-insoluble, non-crosslinked, poly(vinyl alcohol) copolymers which can be hydrated to copolymers having controllably variable hydrogel properties and high strength. Such poly(vinyl alcohol) copolymers are particularly desirable as ophthalmic devices such as contact lenses, corneal implants and transplants, and intraocular lenses.

16 Claims, No Drawings

COPOLYMERS OF POLY(VINYL TRIFLUOROACETATE) OR POLY(VINYL ALCOHOL)

This is a continuation-in-part of application Ser. No. 500,785 filed June 3, 1983, now U.S. Pat. No. 4,528,325.

DESCRIPTION

1. Field of the Invention

This invention relates to non-crosslinked copolymers of poly(vinyl trifluoroacetate) with small amounts of either a vinyl ester or a disubstituted ethylene monomer and to novel copolymers derived therefrom by solvolysis. In another aspect, it relates to shaped articles, films, and coatings of both poly(vinyl trifluoroacetate) copolymers and poly(vinyl alcohol) copolymers, the latter being produced by solvolysis of poly(vinyl trifluoroacetate) copolymers. In a further aspect, it relates to hydrogel ophthalmic devices formed from the poly(vinyl alcohol) copolymers of the invention.

2. Background of the Invention

Polymers of vinyl trifluoroacetate and vinyl alcohol are known in the art.

U.S. Pat. No. 2,436,144 discloses copolymers of vinyl trifluoroacetate and olefinic compounds useful as sheet materials for wrapping, for impregnating and coating materials, and in molding applications. It is noted that optimum properties are obtained when greater than 50 percent by weight of the polymerizable mixture is vinyl trifluoroacetate. The patent claims interpolymers containing 15 to 70 weight percent of vinyl trifluoroacetate. Example VIII discloses the hydrolysis of a vinyl trifluoroacetate homopolymer with sodium ethylate to provide a polymer which is soluble in water. No examples or suggestion of solvolysis of copolymers of poly(vinyl trifluoroacetate) are disclosed.

° Harris, et al., *J. Polymer Sci.* A-1, 4 665-677 (1966) and Haas, et al., *J. Polymer Sci.*, 22 291 (1956), disclose the hydrolysis of poly(vinyl trifluoroacetate) homopolymers to poly(vinyl alcohol) homopolymers with syndiotactic properties (i.e., the stereochemical configurations of the tertiary carbon atoms are regularly alternating). U.S. Pat. Nos. 3,220,960 and 3,361,858 teach that contact lenses can be made from cross-linked poly(vinyl alcohol) homopolymer hydrogels.

Copolymers of vinyl alcohol are known and are reported, e.g., in Japanese Patent 78/91,995 and Japanese Patent 78/103,092; by L. A. Vol'f, et al., *Khim. Volokna,* 2, 14 (1979) and by J. Chernikov, et al., *Nauchn. Tr., Kuban Gos. Univ.*, 243, 141 (1977). The latter discloses cross-linked graft copolymers of poly(vinyl alcohol) and poly(acrylic) acid useful as biologically active man-made fibers.

None of the above-mentioned art discloses that non-crosslinked copolymers of vinyl trifluoroacetate with less than 5 weight percent of certain comonomers can provide, by solvolysis, syndiotactic poly(vinyl alcohol) copolymers which surprisingly are insoluble in water and possess the desirable properties of very strong hydrogels. Further, it is known in the art that when cross-linked poly(vinyl alcohol) homopolymers are to be made into contact lenses they cannot be molded due to the infusibility of poly(vinyl alcohol), but they must be mechanically cut or machined into the contact lens shape after cross-linking or curing, then hydrated to form the hydrogels.

SUMMARY OF THE INVENTION

Briefly, the present invention provides novel, non-crosslinked copolymers of vinyl trifluoroacetate (VTA) and up to 5 weight percent of the VTA of certain comonomers, such as vinyl esters or disubstituted ethylene monomers. Solvolysis of these copolymers provides novel water-insoluble, non-crosslinked, poly(vinyl alcohol) copolymers which can be hydrated to copolymers having controllably variable hydrogel properties and high strength. Such poly(vinyl alcohol) copolymers are particularly desirable as ophthalmic devices including contact lenses, corneal transplants, corneal implants, and intraocular lenses.

It has not previously been recognized that copolymers of poly(vinyl trifluoroacetate) could be used as a source of water-insoluble, non-crosslinked copolymers of poly(vinyl alcohol), or that such novel copolymers would give high tensile strength and high modulus hydrogel articles. The process comprises first casting or molding the poly(vinyl trifluoroacetate) copolymer into articles such as ophthalmic shaped articles in the presence of heat (i.e., thermoforming), which process is disclosed in assignee's copending patent application, U.S. Ser. No. 500,784, filed June 3, 1983, now abandoned, then solvolyzing these shaped article copolymers to provide shaped articles of poly(vinyl alcohol) copolymers which can be hydrated to provide controllably variable hydrogel properties and high strength. This process is particularly advantageous for the purpose of providing surprisingly strong contact lenses and other ophthalmic devices. Other articles, films, buttons, sheets and the like which have hydrogel properties, structural stability, and high strength can also be manufactured using this process.

As used in the present application:

"ophthalmic device" means, for example, a contact lens, corneal transplant, corneal implant, or an intraocular lens;

"corneal transplant" means a replacement for all or part of a cornea which, at the time of transplant, is in contact with the external environment;

"corneal implant or lenticular prosthesis" means a prosthesis located within a cornea and is not in contact with the external environment;

"intraocular lens" means a replacement for the natural lens of an eye and is located posterior to the cornea;

"solvolysis" means the reaction of an ester group capable of cleaving into a carboxyl-containing compound (e.g., amide, ester, or acid) and an alcohol in the presence of a nucleophile such as water (at room temperature), ammonium hydroxide or an organic amine or in the presence of a lower ($C_1$ to $C_4$) alkanol (at temperatures up to 60° C.) in one hour or less;

"thermoformable (thermoprocessable) polymer" means a polymer which may be heated to a temperature in the range of 150° to 300° C., and preferably at about 200° C., and most preferably from 10 to 20° C. above the crystalline melting point ($T_m$) of the poly(vinyl trifluoroacetate) copolymer, maintained at that temperature for 5 sec. to 15 min. and then cooled to provide a shaped article of the polymer which will retain its shape under ambient conditions;

"ambient conditions" means room temperature and pressure;

"hydrogel" means a material which absorbs water in the range of 10 to 95 percent by weight, without itself dissolving;

"high tensile strength" means having a tensile strength greater than 6.9 kg/cm$^2$ (100 psi); and "ophthalmic device button" means a cylindrical-shaped article which is machinable, for example, into a contact lens, an intraocular lens, a corneal transplant or a corneal implant.

DETAILED DESCRIPTION

The present invention provides a copolymer comprising the non-crosslinked reaction product of:

(1) at least 95 weight percent, preferably 95 to 99.99 weight percent, of vinyl trifluoroacetate monomer, and (2) at least 0.01 weight percent, preferably 0.01 to 5 weight percent, of a comonomer selected from vinyl esters and disubstituted ethylenes.

Copolymers of the present invention are prepared by copolymerizing small amounts of selected comonomers with vinyl trifluoroacetate. The amounts of comonomer used will depend to a certain extent on the comonomer chosen, but will generally be less than about 5 percent by weight of the vinyl trifluoroacetate. The amount of comonomer will also depend upon which properties of the polymer and the hydrolyzed polymer optionally derived therefrom are chosen to be maximized.

The comonomer selected will desirably have a reactivity similar to that of vinyl trifluoroacetate in order to obtain relatively uniform copolymerization. Any comonomer chosen preferably polymerizes at a rate comparable to vinyl trifluoroacetate, although polymerization rates from one-half to twice as fast are acceptable. For this reason, other vinyl esters having up to 6 carbon atoms in the alcohol portion of the ester, such as vinyl acetate, vinyl perfluoro-n-butyrate, vinyl formate and the like, are useful. vinyl ethers having up to 8 carbon atoms, such as vinyl tertiary-butyl ether may also be used. Another class of comonomers which are particularly useful are disubstituted ethylenes, e.g., esters or anhydrides of lower alkyl ($C_1$ to $C_4$)-substituted or unsubstituted dicarboxylic acids having up to 8 carbon atoms, such as derivatives of maleic, fumaric, itaconic and citraconic acid, e.g., maleic anhydride, dimethyl itaconate, monoethyl fumarate, and the like. Preferred comonomers are maleic anhydride and vinyl acetate. They have the advantages of ready availability and relatively good solubility in vinyl trifluoroacetate monomer as well as good copolymerizability.

The process for the preparation of copolymers of vinyl trifluoroacetate is preferably a bulk polymerization process carried out in a conventional manner induced, for example, by relatively mild heating or irradiation in the presence of a free-radical initiator in a relatively inert atmosphere, e.g., in a sealed ampoule or other container after degassing.

Included among free-radical initiators are the conventional thermally activated initiators such as organic peroxides, hydroperoxides, and azo compounds. Representative examples of such initiators include benzoyl peroxide, tertiary-butyl perbenzoate, diisopropyl peroxydicarbonate, cumene hydroperoxide, azobis(isobutyronitrile), methyl tricapryl ammonium persulfate, and diacyl peroxides such as decanoyl peroxide and the like. Generally, from about 0.05 to 5 percent by weight of a thermal initiator is used. These thermally activated initiators are preferred.

Photoinitiators may also be employed to initiate polymerization. Such initiators are well known and have been described, for example, in polymerization art, e.g., Chapter II of "Photochemistry" by Calvert and Pitts, John Wiley and Sons (1966). The preferred initiators are photoinitiators which facilitate polymerization when the composition is irradiated. Representative examples of such initiators include acyloin and derivatives thereof, such as benzoin, benzoin methyl ether, benzoin ethyl ether, benzoin isopropyl ether, benzoin isobutyl ether, and α-methylbenzoin; diketones such as benzil and diacetyl, etc.; ketones such as acetophenone, α, α, α-trichloroacetophenone, α, α, α-tribromoacetophenone, α, α-diethoxyacetophenone (DEAP), 2-hydroxy-2-methyl-1-phenyl-1-propanone, o-nitro-α, α, α-tribromoacetophenone, benzophenone and p,p'-tetramethyldiaminobenzophenone; α-acyloxime esters such as benzil-(O-ethoxycarbonyl)-α-monoxime; ketone/amine combinations such as benzophenone/N-methyldiethanolamine, benzophenone/tributylamine, and benzophenone/Michler's ketone; and benzilketals such as benzildiethylketal and 2,5-dichlorobenzildimethylketal. Normally, the photoinitiator is used in amounts ranging from about 0.01 to 5 percent by weight of the total monomeric composition. When the quantity is less than 0.01 percent by weight, the photopolymerization rate becomes extremely slow. If the photoinitiator is used in excess of 5 percent by weight, no correspondingly improved effect is observed. Preferably, about 0.05 to 1.0 percent of photoinitiator is used in the polymerizable compositions.

When the activating energy is ultraviolet light, the irradiation is typically carried out at a temperature of about 0° to 50° C. for 30 seconds to 5 hours or more. Following ultraviolet irradiation, the composition may be heated at 50 to 100° C. to complete the polymerization, provided the free-radical initiator is thermally activatable.

Heating to effect polymerization is generally at 20° to 100° C., and preferably at 30° to 70° C. The precise temperature range depends somewhat on the temperature necessary to activate the free-radical initiator. For example, when azobisisobutyronitrile is used as the initiator the temperature is preferably about 45° to 50° C.

The actual polymerization reaction may be run by combining the vinyl trifluoroacetate, the comonomer and the initiator in a glass ampoule, freezing the reactants with a cold bath such as liquid nitrogen, degassing the ampoule by use of vacuum, and then sealing it. Heating the ampoule, e.g., in a constant temperature bath provides the heat necessary for the initiation of the polymerization reaction. Irradiation generally uses an ultraviolet lamp.

The reaction time is generally several hours, and has conveniently been carried out overnight, i.e., for about 12 to 20 hours, to provide essentially complete conversion of the monomers to copolymers.

Vinyl trifluoroacetate is preferably purified i.e., trace amounts of acetaldehyde, trifluoroacetic anhydride and trifluoroacetic acid are removed from the vinyl trifluoroacetate for best results. The copolymer product is a white to off-white solid which is soluble in N,N-dimethylformamide, ethyl acetate, acetonitrile, warm acetone, and the like. Differential thermal analyses show glass transition temperatures of about 50° to 100° C. and crystalline melt transitions of about 150° to 200° C.

Molecular weights of the poly(vinyl trifluoroacetate) copolymers are typically greater than 200,000, and preferably in the range of 400,000 to 4,000,000, for the weight average molecular weight; such high molecular weights are preferred since approximately ⅔ of the polymer mass is lost in the subsequent solvolysis step which provides poly(vinyl alcohol) copolymers. Molecular weights of the corresponding poly(vinyl alcohol) copolymers obtained through solvolysis are about ⅓ of the value for poly(vinyl trifluoroacetate) copolymers due to loss of mass of the trifluoroacetate groups from the poly(vinyl trifluoroacetate) copolymer. In the present invention the molecular weights of the preferred embodiments generally are characterized by having a polydispersity (P) of less than 2.0. This indicates a relatively narrow molecular weight distribution. P is a generally recognized measurement of the overall sharpness or breadth of the range of the molecular weights of polymer chains and is equal to $$\frac{\text{weight average molecular weight}}{\text{number average molecular weight}}$$

Solvolysis of the trifluoroacetyl group of the above-described poly(vinyl trifluoroacetate) copolymers provides novel poly(vinyl alcohol) copolymers. It is indeed surprising that the poly(vinyl alcohol) copolymers of the present invention have greatly improved hydrogel properties when compared to known hydrogels of comparable water absorption capacity. In particular, it has been observed that very small amounts of comonomer, typically less than 5 percent, provide two or more times the weight of water absorption than the homopolymer does. This increased water absorption is particularly important in the preparation of ophthalmic devices, since increased water absorption is known to correlate well with increased oxygen permeability, a property essential to extended wear of contact lenses and long term use of corneal implants and corneal transplants. As little as 0.25 percent of maleic anhydride in a copolymer was observed to more than double the oxygen permeability of a contact lens prepared according to the present invention. Similarly, only 0.5 percent of maleic anhydride in a copolymer was found to increase the oxygen permeability of a contact lens about four times, and with one percent the increase was about 5.5 times. After solvolysis, the poly(vinyl alcohol) copolymers of the invention comprise 85 to 99.97 weight percent of vinyl alcohol monomer units and 0.03 to 15 weight percent of comonomer units derived from vinyl esters and disubstituted ethylenes.

Solvolysis is typically carried out under relatively mild conditions, for example, using methanolic ammonium hydroxide at approximately 20° C. The base used is preferably a mild base, including (in addition to ammonium hydroxide) the organic amines such as piperidine, morpholine, ethylamine, di(n-propyl)amine, and di(n-butyl)amine, in a diluent. The base chosen may influence the ionic character of the polymer. The diluent used is preferably a non-aqueous liquid which will not dissolve either the poly(vinyl trifluoroacetate) copolymer or the copolymeric poly(vinyl alcohol) solvolysis product. The diluent can be a lower alkanol ($C_1$ to $C_4$) or an ether such as tetrahydrofuran or diethyl ether. The solvolysis is preferably complete, and it is very rapid. For example, using 9:1 methanol:ammonium hydroxide as the solvolysis reagent, solvolysis is essentially complete in 15 minutes. The reaction time may be monitored analytically, e.g., chromatographically to determine both the rate and the completion of the solvolysis.

Although amounts of comonomer up to 5 percent of the vinyl trifluoroacetate copolymers can be used for some purposes to provide desirable copolymers, the amount of comonomer must be carefully selected in order to provide good ophthalmic devices. The amount of comonomer will be less than about 5 weight percent in general, but in order to provide ophthalmic devices with maleic anhydride as the comonomer, it has been found that an amount in the range of 0.01 to 2 weight percent is preferred, and 0.01 to 1 weight percent is most preferred. Copolymers with less than 1 percent maleic anhydride appear to provide, after solvolysis and hydration, hydrogel copolymers having high strength, excellent oxygen permeability and good optical clarity. Copolymers with greater than 1 weight percent maleic anhydride become increasingly hazy.

Copolymers which have been solvolyzed and which contain maleic anhydride as the comonomer contain solvolyzed anhydride units. For example, when ammonium hydroxide is used for solvolysis, the solvolyzed comonomer unit becomes:

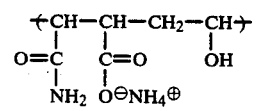

For this reason, the copolymers are very slightly charged at pH 7.

Copolymers with non-solvolyzable comonomer units (e.g., dimethyl itaconate), units much less readily solvolyzed than anhydrides (such as vinyl acetate), or with units (such as vinyl esters) which would not solvolyze to ionic reaction products under the conditions used in the present invention would, of course, yield hydrogels with no associated ionic charge. This characteristic (i.e., no ionic charge) has been found to be of great utility in preparing hydrogel articles with low tendency to absorb proteins from biological fluids such as the tear fluids of the eye.

Although it is clear that strength is a desirable characteristic of shaped polymeric articles of the present invention, it also has been found that various copolymers will maximize various aspects of strength to allow selection of different copolymers of the invention for varying applications. That is, the copolymer with a good tensile strength and modulus but less ideal elongation might be preferred under bending stress in applications such as ophthalmic devices. For applications where a pulling stress will be applied to the article, such as vascular grafts, a combination of all three properties is desirable.

The tensile strength, elongation and modulus are all measurements of the relative mechanical properties of a material. Samples of shaped polymeric articles of both poly(vinyl trifluoroacetate) copolymers and poly(vinyl alcohol) copolymers of the present invention were evaluated using fully hydrated samples at ambient (i.e., room, e.g., 20° C.) temperature. Tensile strength testing was done in accordance with ASTM D412-80. A commercially available tensile tester (MTS Tensile Tester, MTS Inc., Minneapolis, MN) which was modified to accept sample rings rather than strips was used. The rings were held over pegs on a sample holder rather than in conventional jaws, with the object of avoiding sample slippage. Measurements were carried out with samples immersed in water to prevent drying of the samples during testing. It was found that tensile strengths of 6.9 kg/cm$^2$ and greater were obtained. Preferred materials exhibited tensile strengths of greater than 13.8 kg/cm$^2$ and most preferred materials had tensile strengths of greater than 20.7 kg/cm$^2$. By way of comparison, hydrogel materials suitable for use as ophthalmic devices, such as contact lens materials because of high water content typically have tensile strengths of 0.7 kg/cm$^2$ or less. Measuring another aspect of strength, the percent elongation before breaking of samples made from the polymers and copolymers was determined. Preferred materials showed elongation of at least 70 percent, and most preferred materials showed elongation over 150 percent. As noted in TABLE V below, a commercially available contact lens had elongation of 110 percent.

Another aspect of strength, the modulus of elasticity, was also measured. The preferred materials of the invention showed a modulus of greater than 6.9 kg/cm$^2$. Most preferred materials showed a modulus greater than 10.4 kg/cm$^2$. As noted in TABLE V below, a commercially available contact lens exhibited a modulus of elasticity of 3.2 kg/cm$^2$.

Surprisingly, polymer hydrogels of poly(vinyl alcohol) copolymers prepared by the process of the present invention show two distinct improvements over related materials previously known. The strength of these hydrogels of the invention is much greater than that of known, conventional poly(vinyl alcohol) materials such as commercially available poly(vinyl alcohol) derived from poly(vinyl acetate) by alkaline hydrolysis. When films of the poly(vinyl alcohol) copolymers of the present invention are compared to films of commercially available poly(vinyl alcohol) in stress-strain measurements, the total energies to failure, i.e., the areas under the stress-strain curves show distinct differences between the polymer films. Over twice as much energy is required to cause failure of the poly(vinyl alcohol) copolymer films of the present invention. It is hypothesized that this difference in mechanical strength is related to differing intermolecular forces associated with the more highly syndiotactic stereochemical structure (i.e., the stereochemical configurations of the tertiary carbon atoms are regularly alternating) associated with the polymers of the invention. Commercially available poly(vinyl alcohol) has a more atactic structure (tertiary carbon atoms possessing a random stereochemical configuration) and its crystallinity properties are distinctly different i.e., the poly(vinyl alcohol) of the prior art has a lower crystalline melting temperature than the poly(vinyl alcohol) copolymers of the present invention.

A second major improvement is in the hydrogel properties of the polymers. Commercially available poly(vinyl alcohol) derived from poly(vinyl acetate) generally displays water absorption levels of about 40 weight percent or less, depending on drying time and temperature of the polymer film used for hydration. Poly(vinyl alcohol) copolymers of the present invention, and especially copolymers of poly(vinyl alcohol) containing as little as 1 percent or less by weight of various comonomers have water absorption values which may be controllably varied to give hydrogels which absorb much more water than these commercially available poly(vinyl alcohol) materials. By varying the amount of comonomers present, it is possible to tailor the properties of the resulting copolymer. Aqueous liquid absorption (e.g., swelled in water or normal saline) levels of 10 to 95, and preferably 50 to 70 or more weight percent, are obtained and can be useful with polymers of the present invention. It is believed that ionic comonomers can lead to enhanced aqueous liquid absorption by affecting the crystallinity of the poly(vinyl alcohol) copolymer and by increasing the inherent absorptivity of the amorphous regions of the polymers. Non-ionic comonomers may exert their surprisingly large effects principally by affecting polymer crystallinity.

In order to provide ophthalmic devices which are shaped articles of the invention having good structural stability, the solid poly(vinyl trifluoroacetate) copolymers (either in the form of the cast films or as solid polymer granules or powders) can be placed in molds of various desired shapes, e.g., contact lens molds or pressed into sheets or films of various shapes. The polymer-filled molds of various shapes are then heated, generally slightly above (i.e., 10° to 20° C. above) the melting point of the copolymer for 5 seconds to 15 minutes to thermoform the copolymer sample. Using this technique, shaped contact lenses and films, ophthalmic device buttons such as contact lens buttons, sheets and articles of various shapes can be obtained. Good retention of shape is observed if the molded poly(vinyl trifluoroacetate) copolymers are solvolyzed to poly(vinyl alcohol) copolymers. If the poly(vinyl alcohol) copolymers are then hydrated to form hydrogels, it is observed that the hydrogel articles retain their shape under normal room conditions of temperature and pressure and indeed have excellent and improved strength compared to alternative materials. Corneal implant and transplant lenses and also intraocular lenses can be molded or shaped from the copolymers of the invention. Solvent solutions may be used to form articles such as tubes by film coating on a suitable rod or mandrel.

Articles of the invention may also be prepared by any type of molding, casting, vacuum forming, or extrusion process known in the art. For example, hydrogel films or sheets of these copolymers can be prepared by solvent casting a sample of dissolved polymer into a thin film, drying to evaporate the solvent, treating the film for a relatively short time with a solvolysis reagent and then placing the sample in water. The product is the desired hydrogel of poly(vinyl alcohol) copolymer. While various solvents for solvent casting may be used, solvents such as acetone, ethyl acetate or acetonitrile are preferred since their relatively high volatility permits an essentially complete removal from cast films.

Injection molding is an alternative method of molding which is useful to prepare shaped articles from the copolymers of the present invention.

Poly(vinyl trifluoroacetate) copolymers of the invention can be cast or molded into a variety of shapes and then machined or cut into shaped articles such as ophthalmic devices. Subsequently, the shaped articles can be hydrolyzed to hydrogels.

Materials of the present invention are particularly well-suited for use as ophthalmic devices (contact lenses, intraocular lenses, corneal transplants, and corneal implants) because of their optical clarity, biotolerance, hydrophilicity, compliance, low protein absorption, and chemical and physical stability under physiological conditions.

Objects and advantages of this invention are further illustrated by the following examples, but the particular materials and amounts thereof recited in these examples, as well as other conditions and details, should not be construed to unduly limit this invention.

EXAMPLE 1

A mixture of 5 g of vinyl trifluoroacetate, 0.030 g of maleic anhydride and 0.025 g of azobisisobutyronitrile was placed in an ampoule, the contents of which were then frozen with liquid nitrogen. The ampoule was then degassed under a vacuum and sealed. The ampoule was heated in a bath at about 47° C. for about 16 hours. The contents of the ampoule were found to be white solid poly(vinyl trifluoroacetate-maleic anhydride) copolymer. The nuclear magnetic resonance (nmr) spectrum of the copolymer was consistent with the assigned structure.

EXAMPLE 2

One gram of the product of EXAMPLE 1 was pressed between two polyester sheets at 191° C. for about 45 seconds. After cooling the polymer film was placed in a flask and about 20 ml of 10 weight percent concentrated ammonium hydroxide in methanol was added. After standing for 15 minutes, the polymer was separated by decanting the liquids, then dried in air to provide a copolymer of vinyl alcohol and maleic anhydride solvolyzed by ammonium hydroxide. The copolymer was found to form a hydrogel when water was added. Water absorption provided a clear, strong elastic film without dissolving the polymer sample.

EXAMPLE 3

Using the method of EXAMPLE 1, vinyl trifluoroacetate was copolymerized (99/1 weight ratio) with various monomers to provide the copolymers shown in TABLE I:

TABLE I

| Sample | Comonomer | Copolymer |
| --- | --- | --- |
| a | dimethyl itaconate | poly(vinyl trifluoroacetate-co-dimethyl itaconate) |
| b | monoethyl fumarate | poly(vinyl trifluoroacetate-co-monoethyl fumarate) |
| c | vinyl perfluorobutyrate | poly(vinyl trifluoroacetate-co-vinyl perfluorobutyrate) |

Using the method of EXAMPLE 2, the copolymers of the above examples were thermoformed, then solvolyzed to provide the copolymers of TABLE II:

TABLE II

| Sample | Copolymeric starting material | Copolymeric product | Water sorption* (weight percent) |
| --- | --- | --- | --- |
| a | poly(vinyl trifluoroacetate-co-dimethyl itaconate) | poly(vinyl alcohol-co-dimethyl itaconate) | 47 |
| b | poly(vinyl trifluoroacetate-co-monoethyl fumarate) | poly(vinyl alcohol-co-monoethyl fumarate) | 58 |
| c | poly(vinyl trifluoroacetate-co-vinyl perfluorobutyrate) | poly(vinyl alcohol-co-vinyl perfluorobutyrate) | 42 |

*The water sorption of the polymers (percent $H_2O$) of Tables II, III, IV was a weight percent determination using the formula percent $H_2O = [(W_2 - W_1)/W_2] \times 100$ where $W_2$ is a water-swollen sample weight and $W_1$ is dry sample weight.

EXAMPLE 4

A mixture of 50 g vinyl trifluoroacetate, 0.75 g vinyl acetate and 0.25 g of decanoyl peroxide was placed in an ampoule. The ampoule was sealed and maintained at 47° C. for about 16 hours, then at 57° C. for two hours. The product, poly(vinyl trifluoroacetate-polyvinylacetate) copolymer, was removed from the ampoule, pressed into sheets and solvolyzed by treating with 10 percent ammonium hydroxide in methanol. The product was poly(vinyl alcohol-polyvinyl acetate) copolymer as confirmed by nmr spectroscopy.

EXAMPLE 5

A mixture of 50 g vinyl trifluoroacetate, 0.75 g vinyl acetate, and 0.05 g 2-hydroxy-2-methyl-1-phenyl-1-propanone was placed in an ampoule. The ampoule was sealed and then rotated under a ultraviolet sunlamp for about three hours. Air was blown over the ampoule during the irradiation to cool it. The product, poly(-vinyltrifluoroacetate-polyvinyl acetate) copolymer, was removed from the ampoule and pressed into sheets at 191° C. for two minutes. The sheets were solvolyzed in 10 percent ammonium hydroxide in methanol for thirty minutes to provide poly(vinyl alcohol-polyvinyl acetate) copolymer.

EXAMPLE 6

The poly(vinyl alcohol-polyvinyl acetate) copolymers (each containing 1.5 percent by weight (calculated) polyvinyl acetate) from EXAMPLES 4 and 5 were evaluated for various properties. The results are shown in TABLE III below:

TABLE III

| Sample | Weight % water | Oxygen permeability* | Tensile strength (kg/cm$^2$) | Modulus (kg/cm$^2$) | Elongation % | Protein bound (micrograms/cm$^2$) | | |
| --- | --- | --- | --- | --- | --- | --- | --- | --- |
| | | | | | | albumin | / globulin / | lysozyme |
| a (thermally polymerized product of Example 4) | 66 | 32 | 50 | 7.2 | 620 | 2.4 | 0.4 | 4.8 |
| b (UV polymerized product of Example 5) | 69 | 26 | 55 | 6.9 | 515 | 0.5 | 0.25 | 2.4 |

*gas phase oxygen permeability

The data of TABLE III show the excellent physical properties of the poly(vinyl alcohol) copolymers of the invention.

EXAMPLE 7

In order to compare the effect of varying levels of vinyl acetate comonomer, the following general procedure was followed to prepare four copolymers. Vinyl trifluoroacetate and vinyl acetate, quantities as indicated in TABLE V below, and 0.05 g of decanoyl peroxide were sealed in ampoules and maintained at 47° C. for sixteen hours. The polymer was removed from each ampoule and pressed into sheets at 191° C. for about two minutes. Each sample was solvolyzed in 10 percent ammonium hydroxide in methanol for thirty minutes, dried and weighed dry, then allowed to absorb water and weighed to determine the percent water absorbed as shown below:

TABLE IV

| Sample no. | Vinyl trifluoro-acetate (g) | Vinyl acetate (g) | Water absorbed (weight percent) |
|---|---|---|---|
| a | 9.9 | 0.05 | 42 |
| b | 9.875 | 0.075 | 57 |
| c | 9.85 | 0.10 | 68 |
| d | 9.82 | 0.13 | 69 |

The data of TABLE IV show that very small amounts of comonomers significantly improve the water absorption of poly(vinyl alcohol) copolymers.

EXAMPLE 8

A mixture of 50 g of vinyltrifluoroacetate, 0.75 g of vinyl acetate and 0.05 g of 2-hydroxy-2-methyl-1-phenyl-1-propanone was placed in a reactor and covered with a layer of 500 ml of ice-water. The reactor was irradiated under an ultraviolet sunlamp for 3 hours. The product copolymer was separated, rinsed with methanol and dried. The copolymer was then melt-processed according to the procedure of EXAMPLE 2 into film samples and solvolyzed in 10 percent ammonium hydroxide in methanol for 30 minutes to provide poly(vinyl alcohol-co-vinyl acetate) films which when swollen in water gave transparent high strength hydrogel materials.

EXAMPLE 9

Poly(vinyl trifluoroacetate-co-vinyl acetate) from EXAMPLE 8 was purified by dissolving the polymeric product in acetone to provide a 25 percent by weight solution, followed by precipitation into heptane (a nonsolvent for the polymer) resulting in the formation of fibrous polymer. This polymer was dried, then thermally processed by pressing at 191° C. for two minutes into sheets. Thermal stability was measured by standard thermogravimetric analysis techniques (using a Mettler Thermogravimetric Analyzer, Mettler Instruments, Chicago, IL), comparing weight loss at various temperatures. These polymer sheets showed better thermal stability than sheets which had not been purified before melt processing.

EXAMPLE 10

TABLE V shows how percent water absorbed, estimated gas phase oxygen permeability and various measures of strength can be varied by varying the amount of comonomer present in copolymer hydrogels derived from appropriate vinyl trifluoroacetate copolymers prepared according to the method of EXAMPLE 1 and solvolyzed according to the method of EXAMPLE 2.

TABLE V

Variation of Properties of Polyvinyl Alcohol-Maleic Anhydride Copolymers

| Sample | Polymer (% is by weight) | Weight percent water absorbed | Oxygen permeability* | Tensile strength (kg/cm$^2$) | Modulus (kg/cm$^2$) | Percent elongation |
|---|---|---|---|---|---|---|
| a | Polyvinyl alcohol; 0% maleic anhydride | 41 | 5.4 | 162 | 115 | 750 |
| b | Polyvinyl alcohol plus 0.25% maleic anhydride | 54 | 12 | 90 | 44 | 680 |
| c | Polyvinyl alcohol plus 0.5% maleic anhydride | 65 | 20 | 48 | 23 | 530 |
| d | Polyvinyl alcohol plus 1.0% maleic anhydride | 72 | 30 | 26 | 17 | 440 |
| e | Commercially available lens | 55 | 12 | 1.6 | 3.2 | 110 |

*The opthalmic devices of the present invention preferably exhibit an oxygen permeability (pO$_2$) of at least 10 Barrers when measured in accordance with the polarographic oxygen electrode method described by M. F. Refojo et al, "Permeability of Dissolved Oxygen Through Contact Lenses - 1. Cellulose Acetate Butyrate", Cont. Intraocular Lens Med. J. 3(4), 27 (1977). More preferably the devices of the invention exhibit an oxygen permeability of at least 20 Barrers.

The estimated pO$_2$ was determined by the method of Refojo referenced above. The units are $10^{-11}$ ml or O$_2$.cm/sec.cm$^2$.mmHg.

EXAMPLE 11

The copolymer of EXAMPLE 10, Sample c, of 99.5 weight percent vinyl trifluoroacetate and 0.5 weight percent maleic anhydride was dissolved in acetone to give a 20 weight percent solution. The solution was cast onto a clear polyester film in sufficient thickness to give, after solvent evaporation, a clear film of approximately 0.015 inches (about 0.4 mm) thickness. This film was placed in a metal mold designed to form a single contact lens, and the mold (heated at approximately 200° C.) was closed under pressure (hydraulic ram pressure of approximately 1000 psi or 70 kg/cm$^2$) for approximately two minutes.

The mold was cooled and the molded lens was removed and placed in a container with approximately 20 ml of 9/1 methanol-concentrated ammonium hydroxide for about 15 minutes. The solvolyzed contact lens was then air dried and placed in distilled water. Hydration provided a clear, flexible, very strong hydrogel lens.

EXAMPLE 12—preparation of an intraocular lens

A soft intraocular lens material was prepared using the 98.5% of polyvinyl alcohol and 1.5% of polyvinyl acetate copolymer of the invention prepared as described in Example 5 by ultraviolet light induced copolymerization. A pair of disk shaped prostheses were cut with a diamond saw from a disk of the dry polymer of about 0.2 mm thickness. The outside diameter of the disk was 14 mm. The dry disk was then solvolyzed using methanolic ammonium hydroxide. The disks were hydrated with distilled water to a water content of 70% and inserted into the posterial chamber of the right eye of a New Zealand white rabbit using standard medical techniques. The eyes were examined regularly using a slit lamp. After ten months the rabbit eye was observed to be healty, the lens was clear, no evidence of tissue adherence was observed and the implantation was judged successful.

EXAMPLE 13—preparation of a corneal implant

A sheet of hydrogel copolymer material of the invention was prepared and used as a source of corneal implant prosthesis material. The copolymer was prepared according to the method of Example 5 by ultraviolet light induced copolymerization. A pair of disk-shaped prostheses were cut from a disk of dry copolymer with a diamond saw to a thickness of about 0.2 mm and a diameter of 7 mm. The dry disk was then converted to a polyvinyl alcohol-polyvinyl acetate copolymer hydrogel by methanolic ammonium hydroxide solvolysis. Each disk was hydrated to a water content of 70%. The disks were inserted into a pocket located midstroma about 0.24 mm below the epithelial layer of the eye of a New Zealand white rabbit. The pocket was closed using 10-0 nylon stitching for the sutures. The eyes were treated to prevent infection using standard techniques. After fifteen days the rabbit was sacrificed and the eyes examined for effects due to the implant. A slight pannus ingrowth was observed and the cornea was slightly translucent where it had been in contact with the posterior side of the implant due to the manipulation of the tissue to form a pocket. The implant was well tolerated in terms of not causing toxic effects.

EXAMPLE 14—preparation of a corneal implant

Using the method of Example 13 disks were obtained for implantation into the cornea of a primate. Disks were inserted into both the eyes of the primate by cutting corneal pocket incisions and inserting the disks using standard medical procedures. The eyes were examined regularly using a slit lamp and were observed to heal in a satisfactory manner. After four months the animal was sacrificed and the eyes carefully examined. No infection, swelling or evidence of implant material extrusion was observed.

Various modifications and alterations of this invention will become apparent to those skilled in the art without departing from the scope and spirit of this invention, and it should be understood that this invention is not to be unduly limited to the illustrative embodiments set forth herein.

I claim:

1. A non-crosslinked poly(vinyl alcohol) copolymer which is the reaction product of:
    a. a non-crosslinked poly(vinyl trifluoroacetate) copolymer having a molecular weight in the range of 200,000 to 4,000,000 which is the reaction product of:
        1. 95 to 99.99 weight percent of vinyl trifluoroacetate monomer, and
        2. 0.01 to 5 weight percent of a comonomer selected from vinyl esters, vinyl ethers, and copolymerizable disubstituted ethylenes; and
    b. a mild base in a non-aqueous diluent selected so that the poly(vinyl trifluoroacetate) copolymer and its poly(vinyl alochol) copolymer solvolysis product are insoluble therein.

2. The poly(vinyl alcohol) copolymer according to claim 1 wherein said non-aqueous mild base is selected from ammonium hydroxide and organic amines.

3. The poly(vinyl alcohol) copolymer according to claim 2 having 85 to 99.97 weight percent of vinyl alcohol monomer units and 0.03 to 15 weight percent of comonomer units derived from vinyl esters, vinyl ethers, and disubstituted ethylenes.

4. The poly(vinyl alcohol) copolymer according to claim 2 containing vinyl alcohol and vinyl acetate monomer units.

5. The poly(vinyl alcohol) copolymer according to claim 1 having a tensile strength of at least 6.9 kg/cm$^2$.

6. A shaped article comprising a poly(vinyl alcohol) copolymer according to claim 1.

7. The shaped article according to claim 6 which is an ophthalmic device.

8. The shaped article according to claim 6 which is a contact lens.

9. The shaped article according to claim 6 which is an intraocular lens.

10. The shaped article according to claim 6 which is a corneal transplant.

11. The shaped article according to claim 6 which is a corneal implant.

12. A process for preparing a poly(vinyl alcohol) copolymer comprising the steps:
    a. admixing
        (1) 95 to 99.99 weight percent of vinyl trifluoroacetate monomer, and
        (2) 0.01 to 5 weight percent of a comonomer selected from vinyl esters, vinyl ethers, and disubstituted ethylenes,
    b. allowing said admixture to react so as to form a poly(vinyl trifluoroacetate) copolymer having a molecular weight in the range of 200,000 to 4,000,000, and
    c. solvolyzing said poly(vinyl trifluoroacetate) copolymer in a base in a non-aqueous diluent so as to produce said poly(vinyl alcohol) copolymer, said base in a non-aqueous diluent being selected so that the poly(vinyl trifluoroacetate) copolymer and the copolymeric poly(vinyl alcohol) solvolysis product are insoluble therein.

13. The process according to claim 12 wherein said base is selected from ammonium hydroxide and organic amines.

14. The process according to claim 12 wherein said poly(vinyl alcohol) copolymer comprises 85 to 99.97 weight percent of a vinyl alcohol monomer units and 0.03 to 15 weight percent of a comonomer units derived from vinyl esters, vinyl ethers, and distributed ethylenes.

15. The process according to claim 13 wherein said copolymerizable disubstituted ethylene is an ester or anhydride of a lower alkyl ($C_1$ to $C_4$)-substituted or unsubstituted dicarboxylic acid having up to 8 carbon atoms.

16. The process according to claim 13 wherein said comonomer is a vinyl ester or a copolymerizable disubstituted ethylene.

* * * * *